United States Patent
Yonetsuji

(10) Patent No.: US 11,238,623 B2
(45) Date of Patent: Feb. 1, 2022

(54) AUTOMATIC LINE DRAWING COLORING PROGRAM, AUTOMATIC LINE DRAWING COLORING APPARATUS, AND GRAPHICAL USER INTERFACE PROGRAM

(71) Applicant: Preferred Networks, Inc., Tokyo (JP)

(72) Inventor: Taizan Yonetsuji, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 16/609,709

(22) PCT Filed: May 1, 2017

(86) PCT No.: PCT/JP2017/017193
§ 371 (c)(1),
(2) Date: Jan. 6, 2020

(87) PCT Pub. No.: WO2018/203374
PCT Pub. Date: Nov. 8, 2018

(65) Prior Publication Data
US 2020/0118305 A1    Apr. 16, 2020

(51) Int. Cl.
*G06T 11/00* (2006.01)
*G06T 7/90* (2017.01)
(Continued)

(52) U.S. Cl.
CPC .............. *G06T 11/001* (2013.01); *G06T 7/90* (2017.01); *G06T 9/002* (2013.01); *G06T 11/20* (2013.01);
(Continued)

(58) Field of Classification Search
CPC ......... G06T 11/001; G06T 11/20; G06T 7/90; G06T 9/002; G06T 2200/24;
(Continued)

(56) References Cited

U.S. PATENT DOCUMENTS 9,990,734 B2    6/2018   Abreu et al.
2002/0106121 A1  8/2002  McClanahan
(Continued)

FOREIGN PATENT DOCUMENTS

| EP | 1 770 641 A1 | 4/2007 |
|----|--------------|--------|
| JP | 2012-119968 A | 6/2012 |
| WO | WO-2016/190129 A1 | 12/2016 |

OTHER PUBLICATIONS

"Automatic Colorization" https://tinyclouds.org/colorize/ Jan. 2016.*
(Continued)

*Primary Examiner* — Sean T Motsinger
(74) *Attorney, Agent, or Firm* — Foley & Lardner LLP

(57) ABSTRACT

A computer is caused to realize: a line drawing data acquisition function to acquire line drawing data to be colored; a size-reducing process function to perform a size-reducing process on the line drawing data acquired to a predetermined reduced size so as to obtain size-reduced line drawing data; a first coloring process function to perform a coloring process on the size-reduced line drawing data based on a first learned model that has previously learned the coloring process on the size-reduced line drawing data by using sample data; and a second coloring process function to perform a coloring process on original line drawing data by receiving an input of the original line drawing data and colored, size-reduced line drawing data as the size-reduced line drawing data on which the first coloring process function has performed the coloring, based on a second learned model that has previously learned the coloring process on the sample data by receiving an input of the sample data and colored, size-reduced sample data as the sample data on which the first coloring process function has performed the coloring.

20 Claims, 5 Drawing Sheets

(51) Int. Cl.
G06T 9/00 (2006.01)
G06T 11/20 (2006.01)

(52) U.S. Cl.
CPC ............... *G06T 2200/24* (2013.01); *G06T 2207/10024* (2013.01); *G06T 2207/20081* (2013.01); *G06T 2207/20092* (2013.01)

(58) Field of Classification Search
CPC .......... G06T 2207/10024; G06T 2207/20081; G06T 2207/20092
See application file for complete search history.

(56) References Cited

U.S. PATENT DOCUMENTS

| | | | |
|---|---|---|---|
| 2008/0267494 A1* | 10/2008 | Cohen | G06T 3/4007 382/166 |
| 2015/0310305 A1 | 10/2015 | Fang et al. | |
| 2016/0196665 A1 | 7/2016 | Abreu et al. | |
| 2016/0232425 A1 | 8/2016 | Huang et al. | |
| 2018/0068463 A1 | 3/2018 | Risser | |
| 2018/0128734 A1 | 5/2018 | Ikuyama | |
| 2018/0150947 A1* | 5/2018 | Lu | G06T 5/20 |
| 2018/0342084 A1 | 11/2018 | Yonetsuji et al. | |
| 2019/0147361 A1 | 5/2019 | Matsumoto et al. | |
| 2020/0013205 A1* | 1/2020 | Kavidayal | G06T 11/001 |
| 2020/0098144 A1* | 3/2020 | Norouzi | G06T 11/40 |

OTHER PUBLICATIONS

Chao Yu, Gaurav Sharma, Hussein Aly "Computational efficiency improvements for image colorization" Proceedings vol. 9020, Computational Imaging XII 2014.*
Office Action dated Jul. 2, 2020 in U.S. Appl. No. 15/986,138 (US 2018-0342084).
Chen et al., "Image colourisation using linear neighbourhood propagation and weighted smoothing," IET Image Processing, vol. 11 Iss. 5, pp. 285-291 (Mar. 24, 2017).
Office Action dated Mar. 23, 2020, in U.S. Appl. No. 15/986,138 (US 2018-0342084).
Iizuka et al., "Let there be Color!: Joint End-to-end Learning of Global and Local Image Priors for Automatic Image Colorization with Simultaneous Classification," Siggraph (2016), Available on the Internet <URL: http://hi.cs.waseda.ac.jp/~iizuka/projects/colorization/ja/>.
Mizoroki, "# PaintsChainer Artificial intelligence to color illustration was amazingly created by a 29-year-old," Buzz Feed News (Feb. 5, 2017), Available on the Internet <URL: https://www.buzzfeed.com/jp/sakimizoroki/paintschainer?utm_term=.klZbBwYWm#.ch7Avp028>.
Okada, "PaintsChainer who caused a big whirlwind the back side told by the author and real story of AI," BITA DigimaLabo (Mar. 3, 2017), Available on the Internet: <URL: https://bita.jp/dml/paints_chainer>.
Pixiv, "Pictorial communication application "pixiv Sketch" and line drawing automatic coloring service "PaintsChainer" cooperate. We start offering automatic coloring function of Illustration!," Pixiv (May 24, 2017), Available on the Internet <URL: https://www.pixiv.net/info.php?id=4043>.
Preferred Networks, Inc., "PaintsChainer," (Jan. 27, 2017), Available on the Internet <URL: http://paintschainer.preferred.tech/>.
Preferred Networks, Inc., "pfnrt/PaintsChainer: line drawing colorization using chainer," github (Jan. 27, 2017), Available on the Internet <URL: https://github.com/pfnet/PaintsChainer>.
Preferred Networks, Inc., "Pictorial communication application "pixiv Sketch" and line drawing automatic coloring service "PaintsChainer" cooperate. We start offering automatic coloring function of illustration!," (May 24, 2017), Available on the Internet <URL: https://www.preferrednetworks.jp/ja/news/pr20170524>.
Sangkloy et al., "Scribbler: Controlling Deep Image Synthesis with Sketch and Color," arXiv (Dec. 5, 2016), Available on the Internet <URL: https://arxiv.org/pdf/1612.00 835.pdf>.
US Student, "Deepcolor," (Mar. 1, 2017), Available on the Internet <URL: http://web.archive.org/web/20170404081215/http:/color.kvfrans.com/>.
Yonetsuji, "Chainer Meetup #04," Youtube 4:01—(Feb. 23, 2017), Available on the Internet <URL: https://www.youtube.com/watch?v=Fq5ZQ1ccG38>.
Yonetsuji, "PaintsChainer," SlideShare, (Mar. 22, 2017), Available on the Internet <URL: https://www.slideshare.net/taizanyonetuji/chainer-meetup-73457448>.
Yonetsuji, "Published line drawing coloring web service," Qiita (Jan. 1, 2017), Available on the Internet <URL: http://qiita.com/taizan/items/7119e16064cc11500f32>.
Yonetsuji, "Using Chainer to colors ketches yields surprising results," Qiita (Dec. 25, 2016), Available on the Internet <URL:http://qiita.com/taizan/items/cf77fd37ec3a0bef5d9d>.
Iizuka et al., "Neural Network-based Automatic Image Colorization," (Oct. 22, 2018), Available on the Internet: <URL: http://hi.cs.waseda.ac.jp:8082/>.
Office Action dated Nov. 7, 2019 in U.S. Appl. No. 15/986,138 (US 2018-0342084).
Office Action dated Jun. 11, 2019 in U.S. Appl. No. 15/986,138 (US 2018-0342084).
Notice of Allowance dated Oct. 16, 2020, in U.S. Appl. No. 15/986,138 (US 2018-0342084).
Notice of Allowance dated Jan. 14, 2021, in U.S. Appl. No. 15/986,138 (US 2018-0342084).
Taizan, "Using Chainer to color sketches yields surprising results," Qiita, <URL: https://zhuanlan.zhihu.com/p/24712438> retrieved on Dec. 10, 2020 (document has Jan. 2017 in contents) (translation is found at website).
Taizan, "Using Chainer to color sketches yields surprising results," Qiita, <URL: https://qiita.com/jerryli27/items/f526a7d5b69ae758a3a6> retrieved on Dec. 10, 2020 (document has Jan. 2017 in contents).
Ayumin(APPBANK), "An Artificial Intelligence that Automatically Colors Line Paintings, is Too Fantastic", [online], May 22, 2017, https://www.appbank.net/2017/05/22/iphone-application/1347507.php.
IbisPaint, "Auto Paint (English version)",youtube [online][video], especially from 0:18 to 0:49, May 22, 2017, https://www.youtube.com/watch?v=YjCsASIOGmU.
IbisPaint, "Auto Paint (Japanese version)",youtube [online][video], especially from 0:18 to 0:49, May 22, 2017, https://www.youtube.com/watch?v=Xh6PRX3usnk.
Kataoka et al., "Automatic Coloring of Manga Images Using Hostile Networks in Deep Learning", IPSJ SIG Technical Report, vol. 2017-CVIM-206 No.6, pp. 1-6, Mar. 9, 2017.
Shirayama, "Coloring of Monochrome Images", ImageLab, vol. 17-2, pp. 20-24, Feb. 2006.
Kazuaki Suzuki et al., "Drawing Binary Contour Lines and Coloring Surfaces for Pixel Art", Visual Computing, Jun. 22, 2006, pp. 195-200.
"Paints Chainer was introduced into a Windows 10," [online], (Mar. 24, 2017) https://www.ka-net.org/blog/?p=8171.
@ikeyasu, "Learning new data with Paints Chainer" [online], (Submitted on Feb. 18, 2017, updated on Apr. 4, 2017) https://gllta.com/ikeyasu/items/6c1ebed07b281281b116.

* cited by examiner

AUTOMATIC LINE DRAWING COLORING PROGRAM, AUTOMATIC LINE DRAWING COLORING APPARATUS, AND GRAPHICAL USER INTERFACE PROGRAM

TECHNICAL FIELD

The present invention relates to an automatic line drawing coloring program, an automatic line drawing coloring apparatus, and a graphical user interface program, each configured to automatically color a line drawing image.

BACKGROUND ART

In recent years, machine learning using a multilayered neural network, i.e., deep learning, has been employed in various fields. The machine learning is frequently used for techniques in an image processing field, such as image recognition or image generation, and is increasingly and noticeably effective.

For example, Non-Patent Literature 1 discloses a process of automatically coloring a black-and-white photo based on a deep network, in other words, machine learning performance on coloring the black-and-white photo.

CITATION LIST

Non Patent Literature

Non Patent Literature 1: "Joint End-to-end Learning of Global and Local Image Priors for Automatic Image Colorization with Simultaneous Classification", Satoshi Iizuka, Edgar Simo-Serra, and Hiroshi Ishikawa (http://hi.cs.waseda.ac.jp/~iizuka/projects/colorization/ja/)

SUMMARY OF INVENTION

Technical Problem

Incidentally, there is a demand for automatically coloring a line drawing image. Conventionally, there is known a software having a function of coloring a closed region of an image in a color selected, but in many cases, some image, such as a hand-drawn line drawing image, has no closed region. Accordingly, the line drawing image is not simply colored by the conventional software.

Further, in the case of Non Patent Literature 1 where the black-and-white photo is colored, the coloring process presumably uses luminance information included in each pixel as a hint to determine a color of the pixel, but the line drawing image does not include the luminance information. Under these circumstances, it is even more difficult to color the line drawing image.

In view of the respects described above, an object of the present invention is to provide an automatic line drawing coloring program, an automatic line drawing coloring apparatus, and a graphical user interface program, each capable of automatically coloring the line drawing image.

Solution to Problem

An automatic line drawing coloring program according to the present invention is an automatic line drawing coloring program for causing a computer to realize a process for automatically coloring line drawing data. The automatic line drawing coloring program causes the computer to realize: a line drawing data acquisition function to acquire the line drawing data to be colored; a size-reducing process function to perform a size-reducing process on the line drawing data acquired to a predetermined reduced size so as to obtain size-reduced line drawing data; a first coloring process function to perform a coloring process on the size-reduced line drawing data based on a first learned model that has previously learned the coloring process on the size-reduced line drawing data by using sample data; and a second coloring process function to perform a coloring process on original line drawing data by receiving an input of the original line drawing data and colored, size-reduced line drawing data, in other words, the size-reduced line drawing data on which the first coloring process function has performed the coloring process, based on a second learned model that has previously learned the coloring process on the sample data by receiving an input of the sample data and colored, size-reduced sample data, in other words, the sample data on which the first coloring process function has performed the coloring process.

The automatic line drawing coloring program according to the present invention causes the computer to realize a hint information acquisition function to acquire hint information on coloring the line drawing data in at least one color, and in the first coloring process function, the automatic line drawing coloring program causes the computer to realize a function of performing the coloring process by receiving an input of the size-reduced line drawing data and the hint information.

Additionally, in the automatic line drawing coloring program according to the present invention, the first learned model is a model that has learned based on both the sample data incorporating the line drawing data only and thus not incorporating a hint, and the sample data incorporating the line drawing data and the hint as the hint information on coloring the line drawing data in at least one color.

Further, in the automatic line drawing coloring program according to the present invention, the first learned model has previously learned using a Generative Adversarial Network model that alternatively learns a generator that learns coloring on the line drawing data and a discriminator that learns to distinguish previously colored test data from the colored, size-reduced line drawing data generated by the generator.

An automatic line drawing coloring apparatus according to the present invention includes: a line drawing data acquisition unit configured to acquire line drawing data to be colored; a reduction processing unit configured to perform a size-reducing process on the line drawing data acquired to a predetermined reduced size so as to obtain size-reduced line drawing data; a first coloring processing unit configured to perform a coloring process on the size-reduced line drawing data based on a first learned model that has previously learned the coloring process on the size-reduced line drawing data by using sample data; and a second coloring processing unit configured to perform a coloring process on original line drawing data by receiving an input of the original line drawing data and colored, size-reduced line drawing data, in other words, the size-reduced line drawing data on which the first coloring processing unit has performed the coloring process, based on a second learned model that has previously learned the coloring process on the sample data by receiving an input of the sample data and colored, size-reduced sample data, in other words, the sample data on which the first coloring processing unit has performed the coloring process.

A graphical user interface program according to the present invention provides an automatic line drawing coloring tool from a server apparatus, which internally stores the automatic line drawing coloring program, to a client terminal connected via communication network. The graphical user interface program provides a graphical user interface on a display of the client terminal by causing the server apparatus to realize: a line drawing data input form display function to display a form region on a display screen of the client terminal so as to cause a user operating the client terminal to input line drawing data; a line drawing image display function to display a line drawing extracted from the line drawing data inputted, in a line drawing image display region provided on the display screen; and a colored image display function to display a colored image extracted from colored image data, in other words, the line drawing data on which the automatic line drawing coloring program has performed a coloring process, in a colored image display region provided on the display screen.

The graphical user interface program according to the present invention causes the server apparatus to realize: a hint information input tool display function to display a hint information input tool on the display screen so as to receive an input of hint information for specifying an area to be colored in a color selected, the area within the line drawing data displayed in the line drawing image display region; and a coloring execution button display function to display a coloring execution button on the display screen in a state that the hint information input tool display function has received the input of the hint information, so as to cause a coloring process incorporating the hint information to be executed.

Advantageous Effects of Invention

Each of an automatic line drawing coloring program, an automatic line drawing coloring apparatus, and a graphical user interface program according to the present invention performs a first-stage coloring process on size-reduced line drawing data, in other words, line drawing data that has been acquired in an original size and reduced in size. Then, by using colored, size-reduced line drawing data obtained and the line drawing data in the original size, each of the automatic line drawing coloring program, the automatic line drawing coloring apparatus, and the graphical user interface program performs a second-stage coloring process to obtain a colored image (in the original size). With this configuration, it is possible to adequately perform a coloring process on large-size line drawing data. A first learned model, based on which the coloring process is performed, proceeds with learning in a manner incorporating hint information on coloring, so that the coloring process incorporating the hint information on coloring is performed on the line drawing data. Additionally, a GUI is provided from a server apparatus to a display screen of a client terminal. The GUI provides a user with an automatic line drawing coloring tool, and a line drawing image display region and a colored image display region are provided on a shared screen as the function of the GUI. With this configuration, the user observes the original line drawing data and the colored image side by side to directly compare impressions between the images before and after the coloring. Further, the user is allowed to input the hint information to specify an area to be colored in a color selected, the area within the line drawing data displayed in the line drawing image display region. With this configuration, a recoloring process is executed in a manner incorporating the hint information, and the user thus freely supplies the coloring hint on the line drawing data to execute the automatic coloring.

BRIEF DESCRIPTION OF DRAWINGS

FIG. 4 illustrates an example of a display screen that a graphical user interface program of this example displays.

DESCRIPTION OF EMBODIMENTS

First Embodiment

Figure 1:
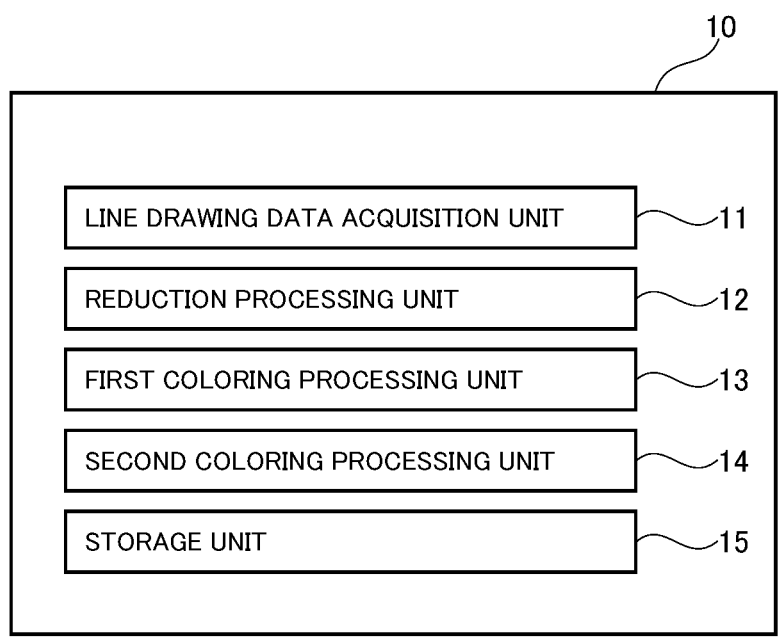
FIG. 1 is a block diagram illustrating a configuration of an automatic line drawing coloring apparatus 10 according to the present invention.

An example of an automatic line drawing coloring apparatus according to the first embodiment will be described below with reference to the drawings. FIG. 1 is a block diagram illustrating a configuration of an automatic line drawing coloring apparatus 10 according to the present invention. Note that the automatic line drawing coloring apparatus 10 may be designed as a special machine, but herein is realized by a typical computer. In this case, the automatic line drawing coloring apparatus 10 includes a Central Processing Unit (CPU), a Graphics Processing Unit (GPU), and a storage such as a memory or a hard disk drive, each normally included in the typical computer (and not illustrated). Additionally, it is naturally to be understood that various processes are executed by a program so as to cause the typical computer to function as the automatic line drawing coloring apparatus 10 of this example.

As illustrated in FIG. 1, the automatic line drawing coloring apparatus 10 includes at least a line drawing data acquisition unit 11, a reduction processing unit 12, a first coloring processing unit 13, a second coloring processing unit 14, and a storage unit 15.

The line drawing data acquisition unit 11 has a function of acquiring line drawing data to be colored. The present invention has no particular limit to the line drawing data to be colored; however, the line drawing data to be colored may desirably be incorporated in sample data in order to cause a learned model to previously learn the line drawing data in a learning process as will be described later. Line drawings vary in thickness or touch of a line drawn, and learning on various forms of line drawing data increases types of line drawings to be colored.

The reduction processing unit 12 has a function of performing a size-reducing process on the line drawing data acquired to a predetermined reduced size, so as to obtain size-reduced line drawing data. The automatic line drawing coloring apparatus 10 of this example is configured to perform a two-stage coloring process as follows: the first coloring processing unit 13 performs coloring on the size-reduced line drawing, based on which, the second coloring processing unit 14 performs coloring on original (original-size) line drawing data. Accordingly, the automatic line drawing coloring apparatus 10 is required first to size-reduce the line drawing data acquired to the predetermined reduced size in order to input the line drawing data into the first coloring processing unit 13.

The first coloring processing unit 13 has a function of performing the coloring process on the size-reduced line drawing data. The coloring process is performed based on a first learned model that has previously learned the coloring process on the size-reduced line drawing data by using sample data formed of the line drawing data.

The second coloring processing unit 14 has a function of performing the coloring process on the original line drawing data by receiving an input of colored, size-reduced line drawing data (i.e., the size-reduced line drawing data on which the first coloring processing unit 13 has performed the coloring process) and the original line drawing data. The coloring process is performed based on a second learned model that has previously learned the coloring process on the sample data, by receiving an input of the sample data (as the line drawing data) together with colored, size-reduced sample data (as the sample data on which the first coloring processing unit 13 has performed the coloring process).

The storage unit 15 has a function of storing data required for various processes performed in the automatic line drawing coloring apparatus 10 that includes the line drawing data acquisition unit 11, the reduction processing unit 12, the first coloring processing unit 13, the second coloring processing unit 14, and others. The storage unit 15 also has a function of storing data obtained as a result of each of the various processes.

Figure 2:
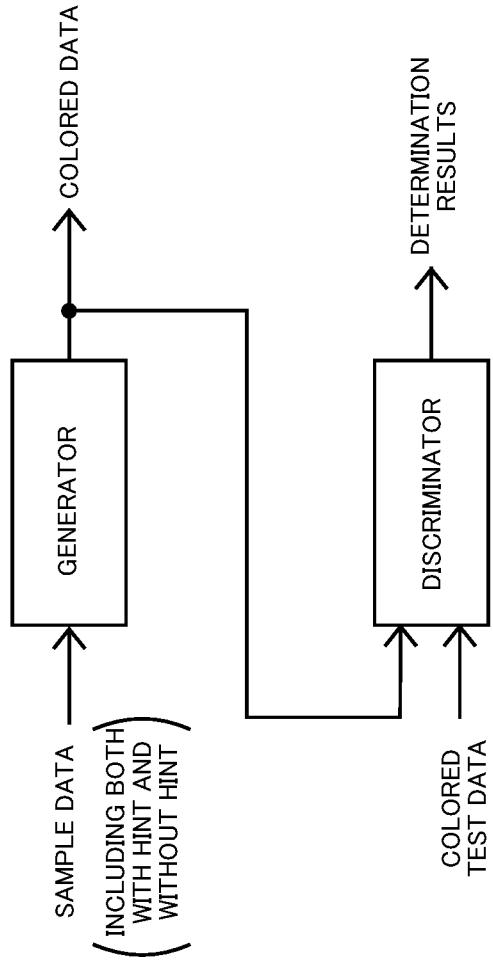
FIG. 2 is a block diagram explaining an example of a learning method of a first learned model.

Next, a learning method of the first learned model used in the first coloring processing unit 13 will be described. FIG. 2 is a block diagram explaining an example of the learning method of the first learned model. The first learned model may be any learned model but preferably be, for example, a Generative Adversarial Network model. As illustrated in FIG. 2, the Generative Adversarial Network model includes a generator and a discriminator. The generator learns to generate a colored image from the sample data as the line drawing data. The discriminator learns to distinguish the colored, size-reduced line drawing data generated by the generator from colored test data previously prepared. In the Generative Adversarial Network model, the generator learns on coloring to make the discriminator wrongly distinguish the coloring as real, and concurrently, the discriminator learns to prevent from being made to wrongly distinguish the coloring as real.

Additionally, with regard to the sample data (as the line drawing data) used for learning, the generator learns on both sample data without hint information on coloring and sample data with the hint information on coloring. A ratio of the sample data without the hint information to the sample data with the hint information may be presumably in various patterns, for example, the sample data without the hint information may account for 40% and the sample data with the hint information may account for 60%. Also, in the sample data with the hint information, the hint information includes coloring specification set as a number between 1 and 128. Further, the hint information is supplied in various methods, for example, the coloring specification may be set in a dot-by-dot or a line-by-line coloring method, or alternatively, as the coloring specification, a predetermined range of area may be completely colored in a color specified. Various methods for supplying the hint information may preferably be preset at learning stages in order to be prepared for various ways in which a user supplies the hint information.

With this configuration, the first learned model learns by using both the sample data with the hint information that is set in a wide range of numbers of hint information and the sample data without the hint information. Accordingly, whether with or without the hint information, the first learned model is capable of performing the coloring process. Note that the first learned model uses, as the sample data for learning, the size-reduced sample data having been reduced to the predetermined reduced size in the reduction processing unit 12.

With regard to a learning method of the second learned model used in the second coloring processing unit 14, as with a case of the first learned model, any learned model may be employed. For example, the Generative Adversarial Network model may be employed. The second learned model uses, as the sample data for learning, the colored, size-reduced data generated by the first learned model and the line drawing data as an original form of the colored, size-reduced data (i.e., the line drawing data in an image size larger than the predetermined reduced size). By receiving an input of each of the colored, size-reduced data and the line drawing data as the original form of the colored, size-reduced data, the generator learns to perform the coloring process on the line drawing data as the original form. Further, the discriminator learns to distinguish the colored data generated by the generator from the colored test data previously prepared. The generator learns on coloring to make the discriminator wrongly distinguish the coloring as real, and concurrently, the discriminator learns to prevent from being made to wrongly distinguish the coloring as real. As a result of these learnings, the second learned model is obtained. Note that the colored, size-reduced data, which the second learned model uses for learning, may be enlarged to match the size of the original line drawing data before being inputted into the generator to be used for learning.

Note that each of the first learned model and the second learned model described above requires both the sample data (as the line drawing data) and the colored test data. Then, it is preferable that the sample data and the colored test data are not prepared as individual images but as a set of images, in other words, the line drawing data along with the colored test data as the line drawing data on which the coloring process has been performed. Thus, the line drawing may be generated from a colored image in an imaging process, e.g., an edge extraction process, and the line drawing data and the colored image data may be prepared as a set. In this case, coloring information on this colored image may be extracted as hint information for use, so that the sample data with the hint information may be concurrently generated.

When learning to perform the coloring process directly on large-size line drawing data, a problem may arise, such as the learning ends as incomplete, a large length of time is required for calculation in the learning process, or the like. In view of such a problem, in this example, the two-stage learning process is performed: the first coloring process is performed on the line drawing data size-reduced to the predetermined reduced size, and based on a result of the first coloring process, the second coloring process is performed on the line drawing data in the original size. With this configuration, learning on coloring the large-size line drawing data is smoothly conducted and the length of time required for the learning process is reduced.

Figure 3:
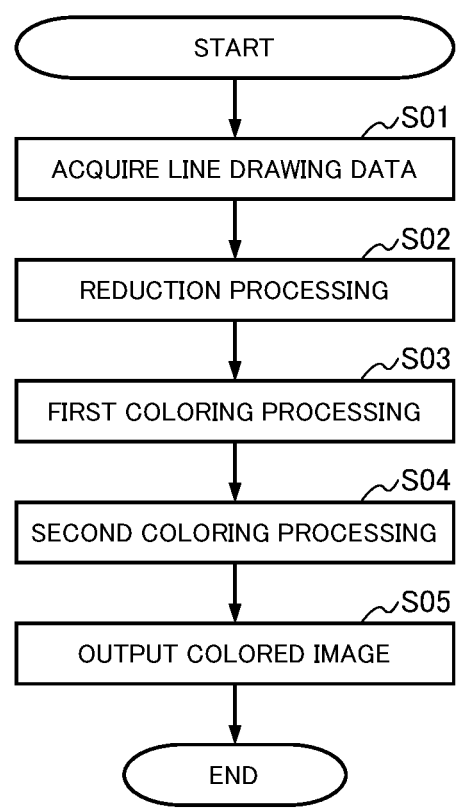
FIG. 3 is a flowchart illustrating a flow of a process performed in the automatic line drawing coloring apparatus 10 of this example.

Next, a flow of the coloring process performed in the automatic line drawing coloring apparatus 10 of this example will be described. FIG. 3 is a flowchart illustrating the flow of the coloring process in the automatic line drawing coloring apparatus 10 of this example. As a start of the coloring process, the automatic line drawing coloring apparatus 10 of this example acquires line drawing data (step S01). The acquisition is performed by, for example, the user selecting the line drawing data to be colored. In this state, in addition to the line drawing data, hint information on coloring the line drawing data may be concurrently acquired. The automatic line drawing coloring apparatus 10 performs a size-reducing process on the line drawing data acquired to a predetermined reduced size (step S02). In this state, the automatic line drawing coloring apparatus 10 retains the line drawing data in an original size separately.

Next, the automatic line drawing coloring apparatus 10 performs a first coloring process on the size-reduced line drawing data (step S03). The first coloring process is performed based on a first learned model that has previously learned the coloring process on the size-reduced line drawing data. In this state, when the hint information is incorporated, the coloring is performed based on the first learned model with the hint information incorporated. The first coloring process results in obtaining colored, size-reduced data.

Next, the automatic line drawing coloring apparatus 10 performs a second coloring process on the line drawing data in the original size acquired in step S01 (step S04). The second coloring process is performed based on a second learned model that has previously learned the coloring process on the line drawing data in the original size by using the colored, size-reduced data. In this state, the colored, size-reduced data may be enlarged to match the original size of the line drawing data before being inputted. The automatic line drawing coloring apparatus 10 obtains colored data (in the original size) and outputs the colored data as a colored image (step S05) to complete the coloring process.

As has been described above, the automatic line drawing coloring apparatus 10 according to the first embodiment acquires the line drawing data in the original size, size-reduces the line drawing data, and performs the first-stage coloring process on the size-reduced line drawing data. Then, by using the colored, size-reduced line drawing data obtained and the line drawing data in the original size, the automatic line drawing coloring apparatus 10 performs the second-stage coloring process to obtain a colored image (in the original size). With this configuration, the automatic line drawing coloring apparatus 10 adequately performs the coloring process on large-size line drawing data. The first learned model, based on which the coloring process is performed, proceeds with learning in a manner incorporating the hint information on coloring. With this configuration, the coloring process incorporating the hint information on coloring is performed on the line drawing data.

Second Embodiment

An example of a graphical user interface program according to the second embodiment, the graphical user interface program configured to provide an automatic line drawing coloring tool, will be described below with reference to the drawings. In the first embodiment, the automatic line drawing coloring apparatus 10 has been described. Additionally provided is a method in which the automatic line drawing coloring tool is provided from a server apparatus that internally stores the automatic line drawing coloring program to a user that accesses the server apparatus via a communication network from a client terminal. In this case, the automatic line drawing coloring tool is provided to the client terminal not only via package software, but may also be provided via a graphical user interface (GUI) functioning on a browser display or others of the client terminal.

An example of using the automatic line drawing coloring tool by accessing the server apparatus via the communication network from the client terminal will be described below. In a description below, the server apparatus internally stores the automatic line drawing coloring program, together with the first learned model and the second learned model, each used in the automatic line drawing coloring program. It is naturally to be understood that the GUI is similarly available for use even when the client terminal internally stores the automatic line drawing coloring program, the first learned model, and the second learned model, and thus that each of these configurations may be included in this example.

Figure 4A:
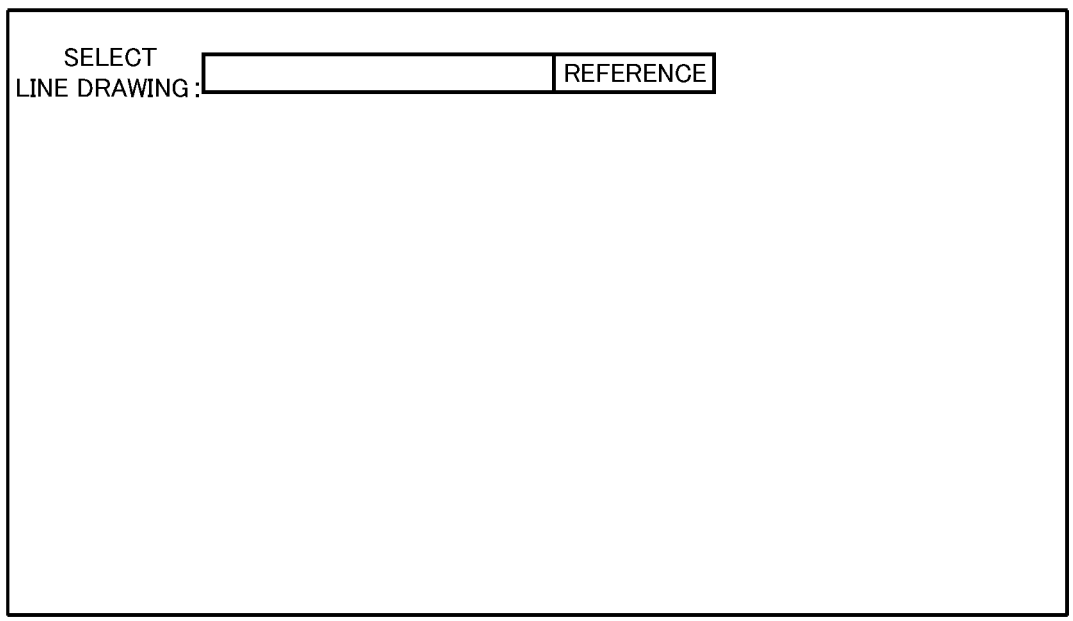
FIG. 4(a) is a display screen to input line drawing data.
Figure 4B:
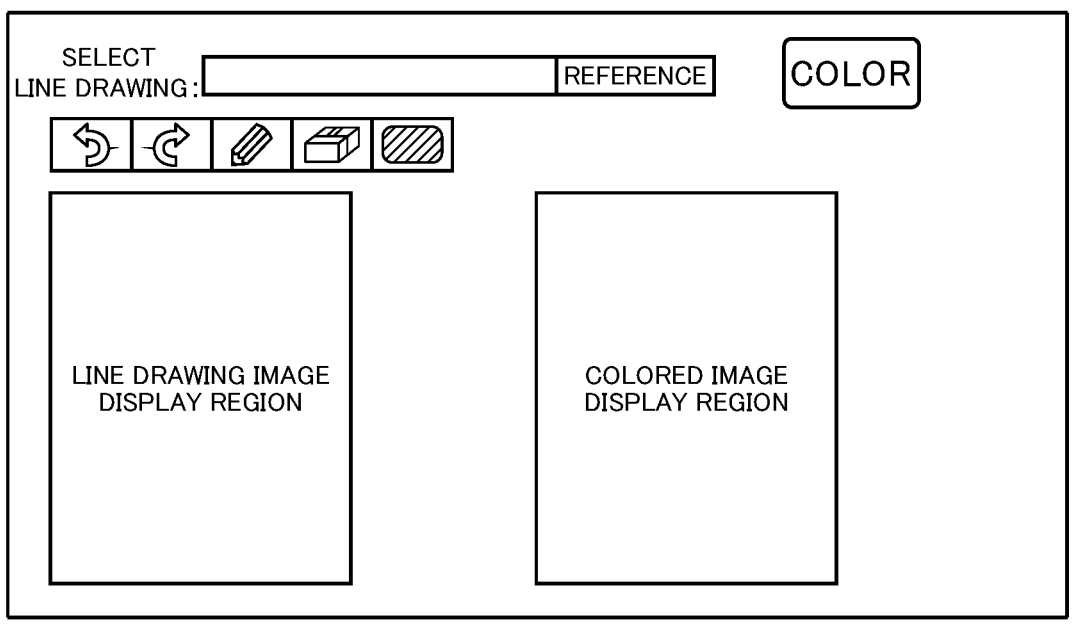
FIG. 4(b) is a display screen when a coloring process has been performed on the line drawing data.

FIG. 4 illustrates an example of a display screen that the graphical user interface program of this example displays. FIG. 4(a) is a display screen to input line drawing data, and FIG. 4(b) is a display screen when a coloring process has been performed on the line drawing data. When the automatic line drawing coloring tool is provided from the server apparatus to the client terminal, as illustrated in FIG. 4(a), a line drawing data input form as a form region, into which the user inputs the line drawing data, is first displayed on the display of the client terminal via, for example, a web browser. With regard to the line drawing data input form, FIG. 4(a) employs a method for specifying a file path as the input of the line drawing data, but the method is not limited thereto. The line drawing data input form may alternatively employ, for example, a drag-and-drop method to select the line drawing data. Note that the display screen described in this example represents a screen displayed to the user when the graphical user interface program, the web browser, or the like provides the GUI, and thus includes each of a display screen generated by the server apparatus and a display screen generated by the client terminal.

When the user specifies the line drawing data, the coloring process automatically starts. The line drawing data selected is transmitted to the server apparatus where the automatic line drawing coloring program performs the coloring process, and colored image data obtained as a result of the coloring process is transmitted to the client terminal. As illustrated in FIG. 4(b), a line drawing extracted from the line drawing data that the user has selected is displayed in a line drawing image display region, and a colored image extracted from the colored image data is displayed in a colored image display region. The line drawing image selected and the colored image are aligned and displayed on a shared screen to enable the user to simultaneously observe the images before and after the coloring.

Further, as illustrated in FIG. 4(b), on the screen displaying the line drawing image and the colored image, a hint information input tool is displayed. The hint information input tool is used to specify an area to be colored in a color selected, the area within the line drawing data displayed in the line drawing image display region. In the example illustrated in FIG. 4(b), the hint information input tool is provided as follows: "undo an operation", "redo an operation", "select a pen to input hint information", "delete the hint information inputted (eraser)", and "select a color used for coloring", but a method in which the hint information is supplied is not limited thereto. For example, the hint information may be supplied in the following method: operate a mouse to select the color used for the coloring, specify the area to be colored within the line drawing image displayed in the line drawing image display region, and color the area in the color selected. The coloring may be performed by actually operating a pointer to add pixels, enter line segments, completely color the area, or the like. Then, with a click on a coloring execution button displayed on the shared screen by operating the mouse or others, the coloring process, in which the hint information is incorporated, is executed. As a result, the colored image, on which the hint information is reflected, is displayed in the colored image display region.

Figure 5:
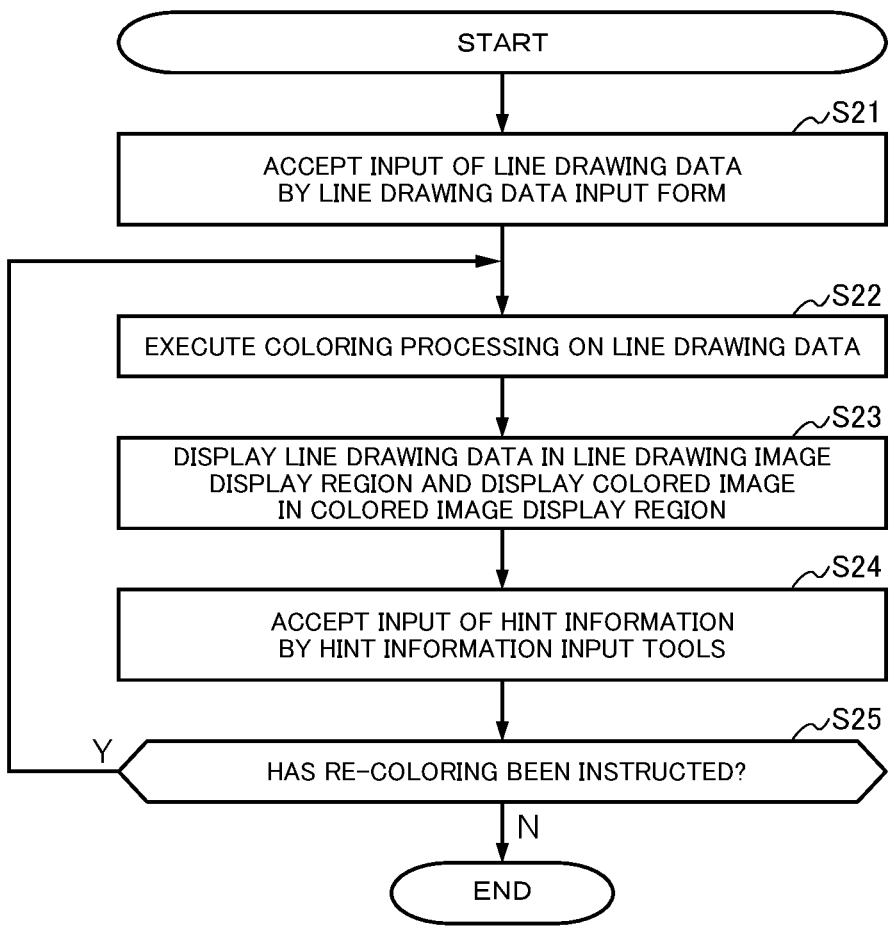
FIG. 5 is a flowchart illustrating a flow of a process in which an automatic line drawing coloring tool is provided based on a GUI according to a second embodiment.

FIG. 5 is a flowchart illustrating a flow of a process in which the automatic line drawing coloring tool is provided based on the GUI according to the second embodiment. As illustrated in FIG. 5, as a start of the process flow in which the automatic line drawing coloring tool is provided, the server apparatus displays the line drawing data input form on the display screen of the client terminal to receive line drawing data inputted by the user (step S21). When the user inputs the line drawing data, the line drawing data is transmitted to the server apparatus. Subsequently, the coloring process is executed on the line drawing data in the server apparatus that has received the line drawing data (step S22). The coloring process executed in step S22 is similar to the flow of the coloring process in the first embodiment as has been described with reference to the flowchart in FIG. 3, and thus the steps of the process similar to steps S01 to S05 in FIG. 3 are executed in step S22.

The colored image data obtained by the coloring process is transmitted to the client terminal. On the display screen of the client terminal, a line drawing image extracted from the line drawing data is displayed in the line drawing image display region provided on the display screen and a colored image extracted from the colored image data is displayed in the colored image display region provided on the display screen (step S23). Concurrently, the hint information input tool is displayed on the display screen to receive hint information that the user inputs via the hint information input tool (step S24). When desiring a recoloring process by supplying a coloring hint, the user inputs the hint information on coloring the line drawing image displayed in the line drawing image display region. Then, when the user clicks on the coloring execution button to specify the recoloring (step S25-Y), the hint information and the line drawing data are transmitted to the server apparatus, and the recoloring process is executed in a manner incorporating the hint information (step S22). The colored image data incorporating the hint information obtained by the recoloring process is transmitted to the client terminal. Then, a colored image extracted from the colored image data incorporating the hint information is displayed in the colored image display region (step S23). With this configuration, the user obtains the colored image data desired and thus no longer needs the recoloring (step S25-N) when the automatic line drawing coloring tool ends.

As has been described above, the GUI is provided from the server apparatus to the display screen of the client terminal. The GUI provides the user with the automatic line drawing coloring tool, and the line drawing image display region and the colored image display region are provided on the shared screen as the function of the GUI. With this configuration, the user observes the original line drawing image and the colored image side by side to directly compare impressions between the images before and after the coloring. Additionally, the user is allowed to input the hint information to specify the area to be colored in the color selected, the area within the line drawing image extracted from the line drawing data and displayed in the line drawing image display region. With this configuration, the recoloring process is executed in the manner incorporating the hint information, and the user thus freely supplies the coloring hint on the line drawing image to execute the automatic coloring. Note that the hint information supplied is used for causing the learned model to execute the coloring in the manner incorporating the hint information, but is not used for coloring the area in the color specified. For that reason, the area is not always colored in the color specified. The automatic line drawing coloring program uses the first learned model and the second model, each configured to learn to incorporate the hint information in the learning process. Accordingly, the hint information specified is used mainly based on a tendency of the sample data and the hint information that are both used in the learning. In this respect, the present invention has a feature differentiating the function from a conventional coloring process in image editing software or the like, in which coloring is performed in the color specified.

In the second embodiment previously described, when the user inputs the line drawing data on the line drawing data input form via the GUI, the coloring process is automatically performed, but this is merely an example. Alternatively, when the user inputs the line drawing data, the line drawing data image extracted from the line drawing data may be displayed in the line drawing image display region so as to cause the user to concurrently input the hint information. Even when conducted in a different sequential order as above, the present invention remains as effective.

Each of the first and the second embodiments has a configuration, in which the first coloring processing unit performs the first-stage coloring process on the line drawing data that has been reduced to the predetermined reduced size. Then, by using the colored, size-reduced line drawing data obtained (as a result of the first-stage coloring process) and the line drawing data in the original size, the second coloring processing unit performs the second-stage coloring process. With this configuration, the coloring process on large-size line drawing data is adequately performed. In this example, the coloring process is divided into the two stages but is not limited thereto. Alternatively, the coloring process may be divided and performed in three or more stages.

REFERENCE SIGNS LIST 10 automatic line drawing coloring apparatus
11 line drawing data acquisition unit
12 reduction processing unit
13 first coloring processing unit
14 second coloring processing unit
15 storage unit

The invention claimed is:

1. A method of automatically coloring, comprising:
acquiring, by at least one processor, a coloring target image;
generating, by the at least one processor, a reduced coloring target image from the coloring target image, a size of the reduced coloring target image being smaller than a size of the coloring target image;
performing, by the at least one processor, a first coloring processing using the reduced coloring target image based on a first learned model to generate a first colored image, a size of the first colored image generated by the first coloring processing being smaller than the size of the coloring target image; and
performing, by the at least one processor, a second coloring processing by using the coloring target image and the first colored image based on a second learned model to generate a second colored image.

2. The method according to claim 1, wherein the size of the coloring target image and a size of the second colored image are the same.

3. The method according to claim 1, wherein the size of the first colored image is smaller than a size of the second colored image.

4. The method according to claim 1, wherein the first learned model is selected by a user.

5. The method according to claim 1, wherein the second learned model is selected by a user.

6. The method according to claim 1, further comprising:
acquiring, by the at least one processor, hint information on coloring the coloring target image, wherein the first coloring processing is performed with the reduced coloring target image and the hint information as inputs.

7. The method according to claim 1, wherein the coloring target image includes line drawing data.

8. The method according to claim 1, further comprising:
enlarging, by the at least one processor, the first colored image after performing the first coloring processing, and inputting the enlarged first colored image into the second learned model for the second coloring processing.

9. The method according to claim 1, further comprising:
enlarging, by the at least one processor, the first colored image to match the size of the coloring target image after performing the first coloring processing, and inputting the enlarged first colored image into the second learned model for the second coloring processing.

10. The method according to claim 1, wherein the first learned model is a Generative Adversarial Network model.

11. A coloring apparatus comprising:
at least one memory; and
at least one processor configured to:
acquire a coloring target image;
generate a reduced coloring target image from the coloring target image, a size of the reduced coloring target image being smaller than a size of the coloring target image;
perform a first coloring processing using the reduced coloring target image based on a first learned model to generate a first colored image, a size of the first colored image generated by the first coloring processing being smaller than the size of the coloring target image; and
perform a second coloring processing by using the coloring target image and the first colored image based on a second learned model to generate a second colored image.

12. The coloring apparatus according to claim 11, wherein the size of the coloring target image and a size of the second colored image are the same.

13. The coloring apparatus according to claim 11, wherein the size of the first colored image is smaller than a size of the second colored image.

14. The coloring apparatus according to claim 11, wherein the first learned model is selected by a user.

15. The coloring apparatus according to claim 11, wherein the second learned model is selected by a user.

16. The coloring apparatus according to claim 11, wherein the at least one processor is further configured to acquire hint information on coloring the coloring target image, wherein the first coloring processing is performed with the reduced coloring target image and the hint information as inputs.

17. The method according to claim 1, wherein
the performing the first coloring processing includes inputting the reduced coloring target image into the first learned model to generate the first colored image as an output of the first learned model, and
the performing the second coloring processing includes inputting the coloring target image and the first colored image into the second learned model to generate the second colored image as an output of the second learned model.

18. The coloring apparatus according to claim 11, wherein
in performing the first coloring processing, the at least one processor is configured to input the reduced coloring target image into the first learned model to generate the first colored image as an output of the first learned model, and
in performing the second coloring processing, the at least one processor is configured to input the coloring target image and the first colored image into the second learned model to generate the second colored image as an output of the second learned model.

19. The coloring apparatus according to claim 11, wherein the at least one processor is further configured to:
enlarge the first colored image after performing the first coloring processing, and
input the enlarged first colored image into the second learned model for the second coloring processing.

20. A non-transitory computer readable medium storing therein a program which, when executed by at least one processor, performs a method comprising:
acquiring a coloring target image;
generating a reduced coloring target image from the coloring target image, a size of the reduced coloring target image being smaller than a size of the coloring target image;
performing a first coloring processing using the reduced coloring target image based on a first learned model to generate a first colored image, a size of the first colored image generated by the first coloring processing being smaller than the size of the coloring target image; and
performing a second coloring processing by using the coloring target image and the first colored image based on a second learned model to generate a second colored image.

* * * * *